No. 738,989. PATENTED SEPT. 15, 1903.
R. DICKE.
WOOD SCREW CUTTING MACHINE.
APPLICATION FILED DEC. 10, 1900.
NO MODEL. 2 SHEETS—SHEET 1.
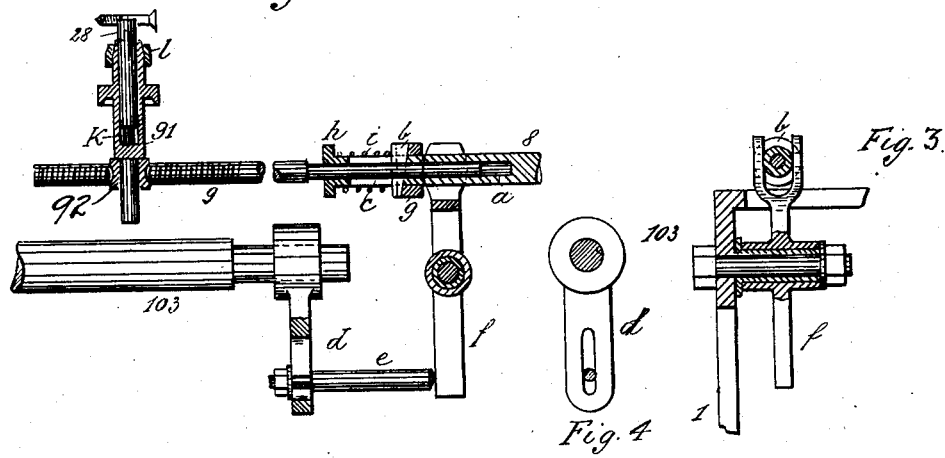
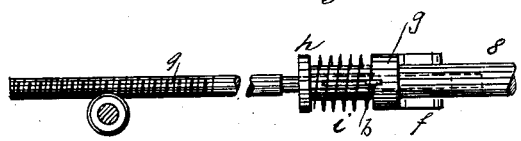
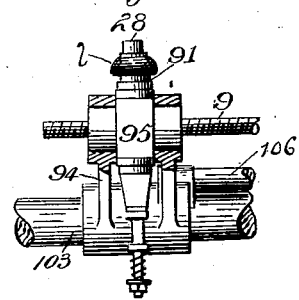
Witnesses
Otto Penner
Hermann Schlichting
Inventor
Robert Dicke
by A. Saunas
Atty

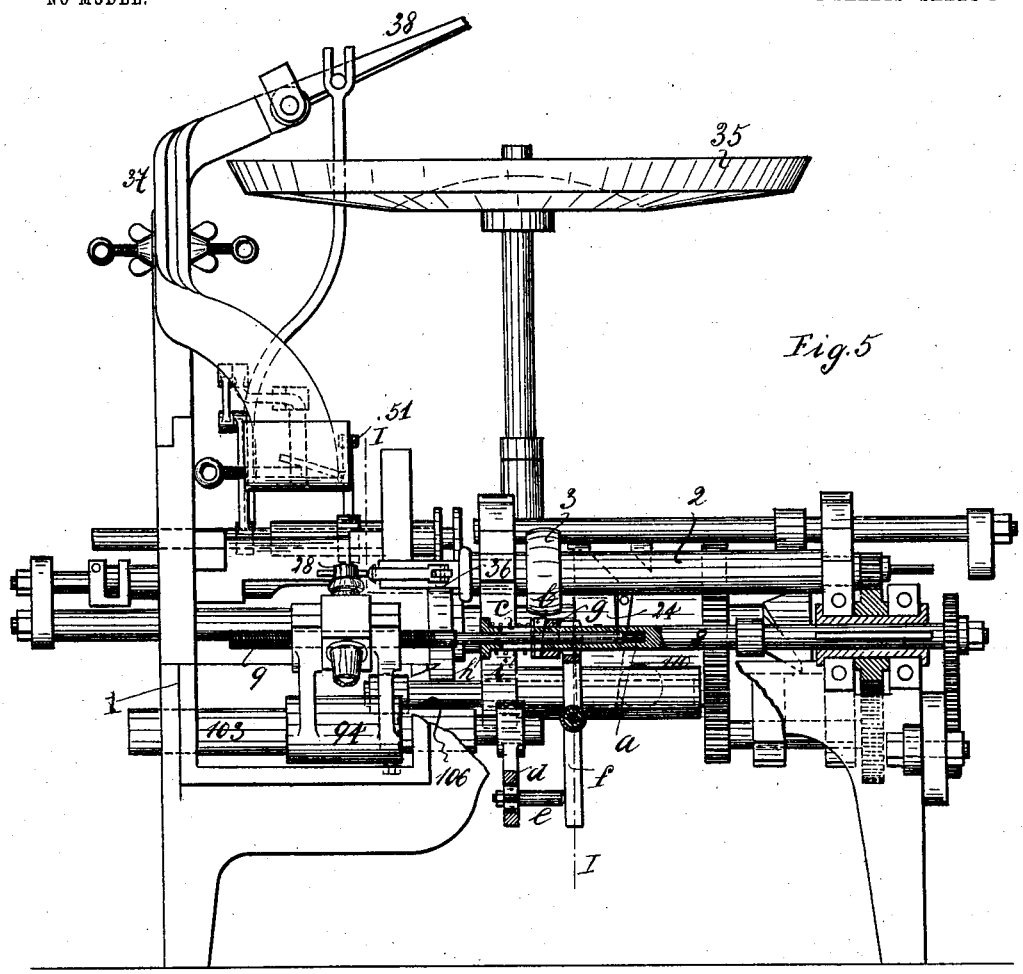

No. 738,989.

Patented September 15, 1903.

UNITED STATES PATENT OFFICE.

ROBERT DICKE, OF MILSPE, GERMANY.

WOOD-SCREW-CUTTING MACHINE.

SPECIFICATION forming part of Letters Patent No. 738,989, dated September 15, 1903.

Application filed December 10, 1900. Serial No. 39,449. (No model.)

*To all whom it may concern:*

Be it known that I, ROBERT DICKE, mechanical engineer, of the city of Milspe, in the Province of Westphalia, Germany, have invented certain new and useful Improvements in Wood-Screw-Cutting Machines; and I do hereby declare that the following is a full, clear, and exact description of the same.

My invention has for its objects an improvement of the machine patented under No. 669,623, its object being to improve the said machine, enabling it to worm screw-blanks nearly to their head.

In the accompanying drawings, Figure 1 is a front view of a new mechanism applied to the machine. Fig. 2 is a plan thereof; Fig. 3, a cross-section. Figs. 4 and 7 are details; Fig. 5, the front elevation of the wood-screw machine; Fig. 6, a cross-section along line I I of Fig. 5.

As the machine is completely described in my patent referred to above, I shall describe it only so far as is required for a better understanding of my invention.

In the bed 1 of the machine is journaled the live-spindle 2, provided with the rotary chuck 36 for the wire blanks, which is rotated by the pulley 3. From the hopper 35 the screw-blanks are fed to the chuck 36 by means of the conveyer-chute 37, its fork 38 being raised and lowered by means similar to that shown in the aforesaid patent, which leads the screw-blank into said chute, from which they are taken by a gripper 51 and inserted into the chuck. The nail is threaded by means of a rotary cutter 28, consisting of a bolt and provided at its top surface with cutting-teeth. Said bolt is of a diameter as small as possible in order to cut the thread near to the head of the screw-blank. For this purpose the cutter 28 is fixed in a spindle 91, rests on a pin $k$, and is clamped in the spindle by a cone-nut 1. The spindle 91 is carried in a holder 95, which is pivotally lodged in a carriage 94. The cutter-spindle 91 is rotated by the worm 9, which meshes with the worm-wheel 92, fixed to the said cutter-spindle. Said worm passes freely through the holder and carriage 94 and is carried by the forward end of the bar 8, which is rotated by suitable gearing. The carriage is rigidly mounted on bars 103 and made to travel to and fro in the bed 1 of the machine. For this purpose it is fitted with a rod 106, carrying a roller 110, on which acts a cam-flange of the drum 24, (fully described in my patent referred to above,) and as said drum revolves the carriage 94 is correspondingly reciprocated.

The object of my invention is to enable the worm-wheel 92 to travel evenly along its screw 9, while the cutter travels along its blank, although the cutter is much smaller than the wheel 92. By having a smaller cutter the blank can be threaded close up to its head, as mentioned before.

The difference between the surface velocity of the cutter and worm-wheel resulting from their different diameters is taken up by feeding the worm 9 by means of the following arrangement.

The worm 9 is extended to form a shaft which fits into the hollow spindle 8 and which may be reciprocated in said spindle.

The rotation of the spindle 8 is imparted to the said worm by a wedge $b$, which passes through a slot $c$ in the shaft, forming the extended part of the worm 9 and projecting beyond the surface of said shaft to engage with the hollow spindle 8.

The reciprocation of the worm is effected by the carriage 94 through an arm $d$, fixed to a bar 103 forming part of said carriage, said arm $d$ having an adjustable bolt $e$, which oscillates a lever $f$, pivoted centrally to the bed 1 of the machine and having its upper end forked to embrace the spindle 8 and bearing against a ring $g$, slidable on said spindle and pressing against the wedge $b$. By means of the said lever $f$ worm 9 can be shifted in the direction toward the wheel 92.

The coiled spring $i$ on the spindle 8, between the collar $h$ and wedge $b$, acts to return the worm 9 to its normal position after each reciprocation.

The bolt $e$ is made vertically adjustable in order to vary the stroke of the worm 9.

The operation of my improved machine is as follows: The screw-blank is inserted into the chuck 36, as described in my Patent No. 669,623, and revolved. The cutter 28 is also revolved and pressed into the blank, as described in the said patent, and at the same time carried along the nail to cut a thread. In traveling along the carriage 94 causes, by means of bolt $e$, a turning of lever $f$, which shifts with its upper end the revolving worm toward its wheel 92, and in this manner the difference in the surface velocity of cutter 28 and worm-wheel 92 is taken up by the counter-shifted worm.

What I claim, and desire to secure by Letters Patent, is—

1. In a wood-screw-cutting machine having a rotatable chuck adapted to receive a screw-blank, the combination of a carriage and means to reciprocate the same, a spindle and a cylindrical fluted cutter adapted to be secured therein, a holder for the spindle mounted on the carriage, a worm of greater diameter than the cutter secured on the spindle, a screw-shaft engaging the worm, means for rotating the screw-shaft and means for moving said shaft in a direction opposite to the movement of the carriage during the cutting operation, substantially as set forth.

2. In a wood-screw-cutting machine having a rotatable chuck adapted to receive a screw-blank, the combination of a carriage and means to reciprocate the same, a spindle and a cylindrical fluted cutter adapted to be secured therein, a holder for the spindle mounted on the carriage, a worm of greater diameter than the cutter secured on the spindle, a screw-shaft engaging the worm, a spindle slidably connected with the screw-shaft, a double-armed lever engaging said shaft and operated upon by the carriage for moving said shaft in a direction opposite to the movement of the carriage during the cutting operation, substantially as set forth.

ROBERT DICKE.

Witnesses:
OTTO KÖNIG,
J. A. RITTERSHAUS.